United States Patent [19]

Dunder et al.

[11] Patent Number: 5,997,075

[45] Date of Patent: Dec. 7, 1999

[54] BEAM AND VEHICLE BODY STRUCTURE

[75] Inventors: Vilho Dunder, Haparanda, Sweden; Mauri Määttänän, Esbo, Finland

[73] Assignee: Dunder Trading I Haparanda Aktiebolag, Haparanda, Sweden

[21] Appl. No.: 08/836,710

[22] PCT Filed: Oct. 20, 1995

[86] PCT No.: PCT/SE95/01238

§ 371 Date: Jun. 9, 1997

§ 102(e) Date: Jun. 9, 1997

[87] PCT Pub. No.: WO96/15018

PCT Pub. Date: May 23, 1996

[30] Foreign Application Priority Data

Nov. 14, 1994 [SE] Sweden .................. 9403896

[51] Int. Cl.$^6$ .................................................. B62D 25/00
[52] U.S. Cl. .................. 296/178; 296/205; 52/731.6; 52/737.6
[58] Field of Search ............... 296/29, 178, 205, 296/191; 105/396, 397, 404; 52/731.6, 732.1, 737.6

[56] References Cited

U.S. PATENT DOCUMENTS

| | | | |
|---|---|---|---|
| 2,460,982 | 2/1949 | Gilpin | ................. 52/731.6 |
| 4,974,900 | 12/1990 | Destefani et al. | ................. 296/191 |
| 5,042,395 | 8/1991 | Wackerle et al. | ................. 296/191 |
| 5,287,813 | 2/1994 | Hanni et al. | ................. 296/205 |
| 5,320,403 | 6/1994 | Kazyak | ................. 296/205 |
| 5,338,080 | 8/1994 | Janotik et al. | ................. 296/29 |

FOREIGN PATENT DOCUMENTS

| | | |
|---|---|---|
| 0 013 940 | 8/1980 | European Pat. Off. . |
| 0309358 | 3/1989 | European Pat. Off. ........ 296/29 |
| 0 369 134 | 5/1990 | European Pat. Off. . |
| 0 465 427 | 1/1992 | European Pat. Off. . |
| 2501309 | 9/1982 | France ................. 296/191 |
| 91/18780 | 12/1991 | WIPO . |

*Primary Examiner*—Dennis H. Pedder
*Attorney, Agent, or Firm*—Griffin, Butler, Whisenhunt & Szipl, LLP

[57] ABSTRACT

The invention relates to a beam made of metal intended to be included as a construction element in a coachwork body for buses, trams and similar vehicles in order to be connected, in the coachwork body, to other profiled elements (16, 26, 56) which extend at right angles to said beam (1, 2). What is characteristic of the beam is that it has in profile a closed cavity (3, 43, 83) in one corner of the profile, that at least four legs (11–14, 51–54) extend out in pairs in different directions from the closed cavity, and that the legs in each pair are mutually parallel. The invention also relates to the coachwork in which the beam is included as a part.

14 Claims, 6 Drawing Sheets

5,997,075

BEAM AND VEHICLE BODY STRUCTURE

TECHNICAL FIELD

The invention relates to a beam made of metal intended to be included as a construction element in a coachwork body for buses, trams and similar vehicles in order to be connected, in the coachwork body, to other profiled elements which extend at right angles to said beam. The invention also relates to the coachwork, in the coachwork body of which said beam is included as a construction element.

STATE OF THE ART

Beams of the type indicated above, and likewise coachwork bodies in which such beams are included as construction elements, are already known from e.g. DE-A-27 12 752, U.S.A. 4 425 001 and SE 466 798.

BRIEF DESCRIPTION OF THE INVENTION

The aim of the invention is to offer improvements in relation to known art. More specifically, it is to offer a beam which can be arranged in the longitudinal upper and/or lower corners of the coachwork body. In relation to the construction according to the said SE 466 798, the invention aims to offer a beam of relatively simple design at the same time as it has advantages in terms of strength and can fulfil a number of functions which in the known coachwork construction have required a number of interacting longitudinal beams. In particular, the invention relates to a beam which is suitable to form part of an adhesively bonded coachwork body.

This and other aims can be achieved by the invention being characterized by what is indicated in the subsequent patent claims. Further characteristics and aspects of the invention emerge from the following description.

BRIEF DESCRIPTION OF THE FIGURES

In the following description, reference will be made to the attached drawing figures, of which

DETAILED DESCRIPTION OF THE INVENTION

Figure 1:
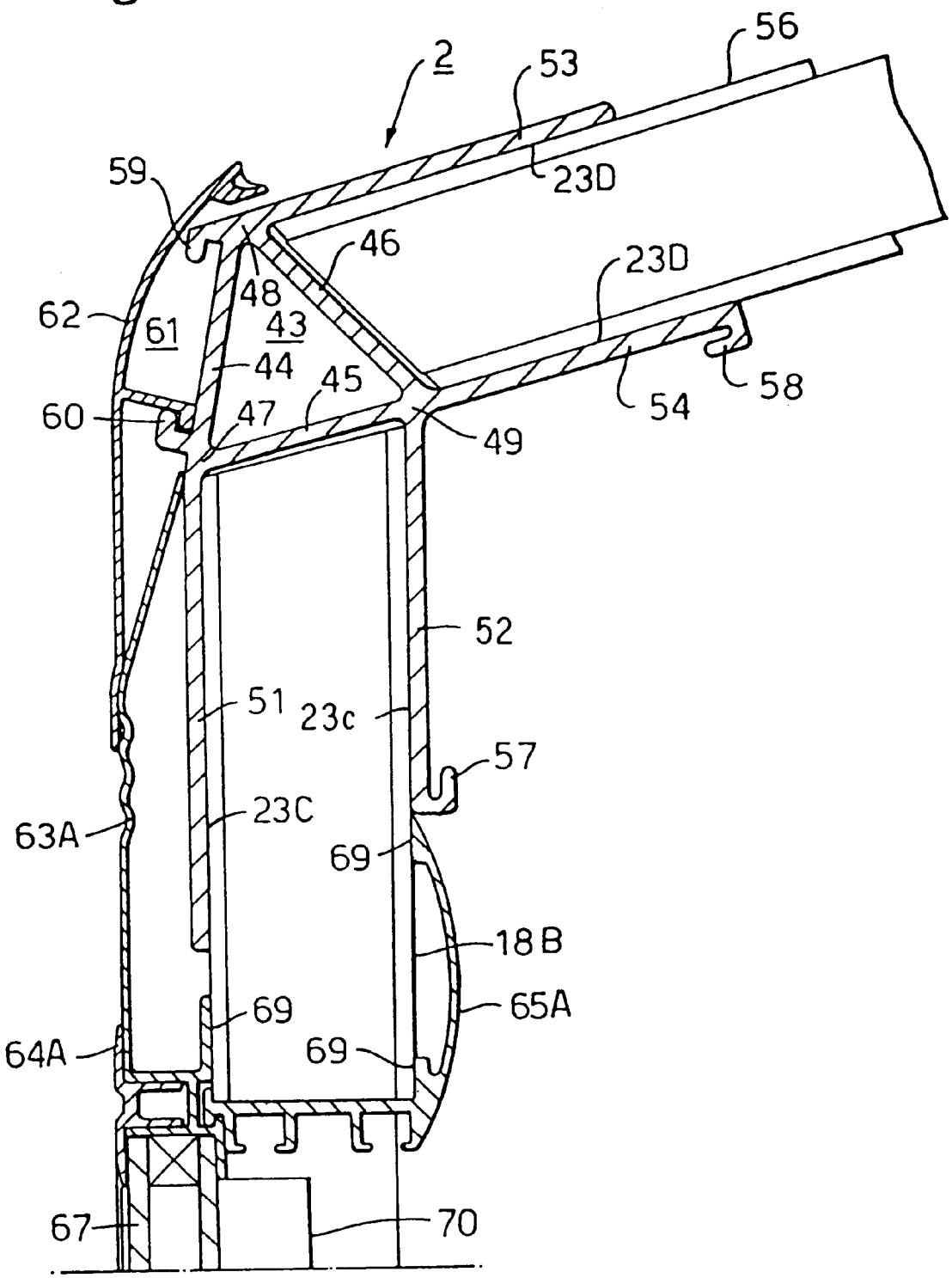
FIG. 1 represents a vertical section through a side of a coachwork, showing the upper and lower corner pans of the coachwork body, which include longitudinal beams according to a first and, respectively, a second preferred embodiment of the beam according to the invention, and in which parts which are non-essential to an understanding of the invention have been omitted in order that what is essential appears more clearly.
Figure 1A:
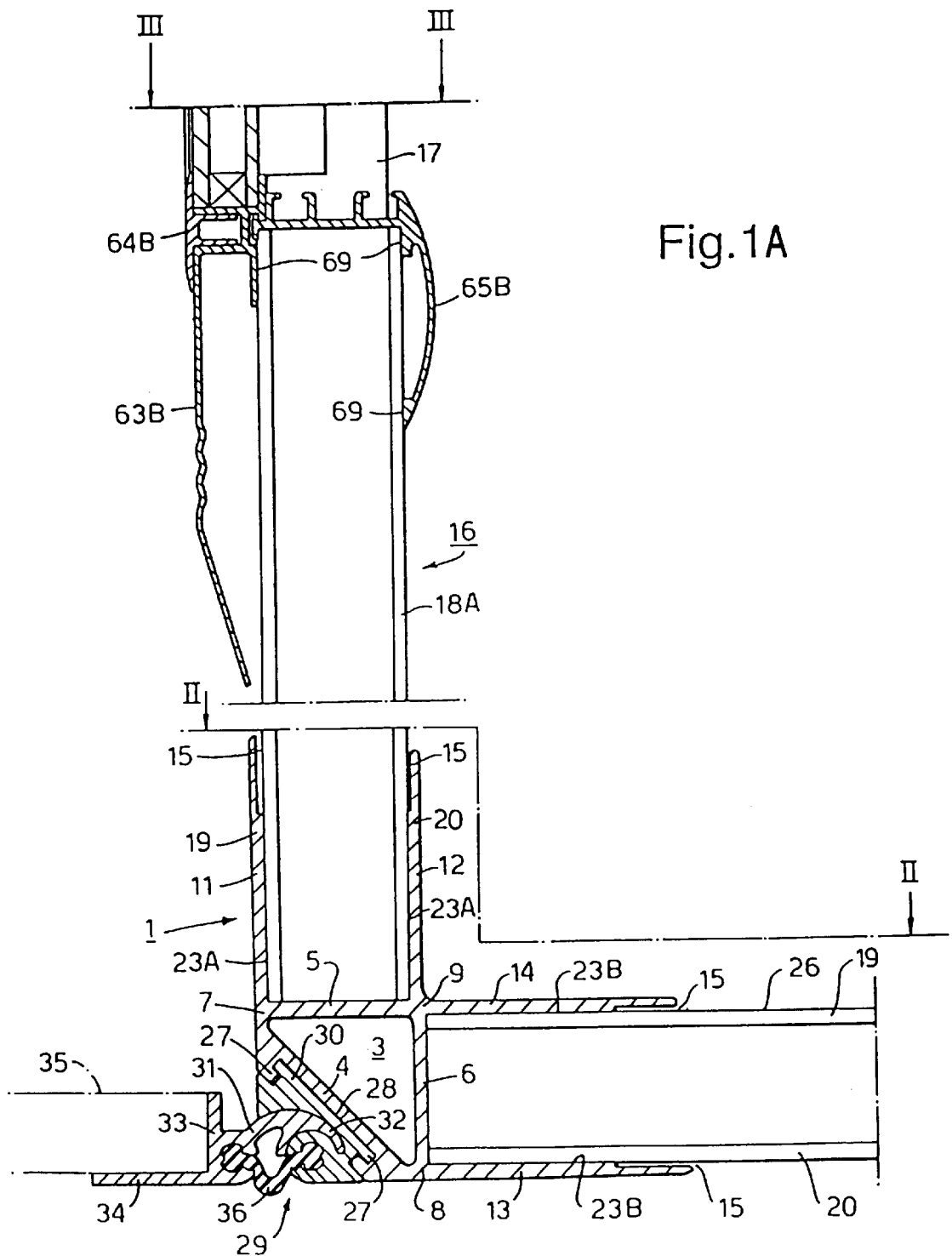

In FIG. 1, the lower part of the figure shows the lower longitudinal corner in a coachwork body for a bus, i.e. the corner between the long side of the bus and the floor above the chassis of the bus. In this corner, there is a lower corner beam 1 according to a first embodiment of the beam according to the invention. The upper part of FIG. 1 shows in cross-section the upper longitudinal corner of the bus, i.e. the corner between the side and roof of the bus, which includes an upper corner beam 2 according to a second embodiment of the beam according to the invention.

The lower corner beam 1 has in profile a closed polygon, more specifically a closed triangle 3 in one corner of the profile. This part of the beam therefore has the form of a box girder of triangular section. According to the embodiment, the triangle 3 consists of an right-angled isosceles triangle. The hypotenuse of the triangle forms an outer corner side 4 on the beam. The two catheti 5 and 6 form a second, horizontal side 5 and, respectively, a third, vertical side 6. The outer corner side 4 extends between a first 7 and a second 8 corner of the triangle. The third corner 9 is the right-angled one.

According to the embodiment, the closed triangle 3 is empty, i.e. it is not divided into sections by partitions or in another manner, e.g. filled with plastic foam or the like, although this possibility is not excluded within the context of the invention. However, the strength-increasing effect which such partitions and filling, respectively, would be capable of providing is not in proportion to the increase in cost such a complication would involve.

Four legs extend in pairs out from the closed triangle 3. A pair of first and second mutually parallel legs 11, 12 extends vertically upwards from the first 7 and, respectively, third 9 corners, at right angles to the second side 5 of the triangle. A pair of third and fourth mutually parallel leas 13 and 14 extends horizontally out from the second 8 and third 9 corners, at right angles to the third side 6 of the triangle. All legs 11–14 have, in the cross-section of the beam, a length which is considerably greater than any of the three sides 4–6 of the triangle.

Arranged between the first and second legs, which normally extend along the entire length of the coachwork, possibly with recesses for doors, is a number of vertical wall uprights 16.

The wall uprights 16 are arranged preferably at regular intervals along the entire length of the coachwork, and between each pair of adjacent wall uprights there is a window 67. Each wall upright 16, FIG. 2, consists, in a manner known per se from the said SE 466 798, of an inner upright 17, which extends from the lower corner beam 1 past the window 67 up towards the upper corner beam 2, and an outer upright 18A which surrounds the inner upright 17 in its lower part and a similar outer upright 18B which surrounds the inner upright in the region above said window 67. The wall upright 16 has a width across the longitudinal direction of the corner beam 1 corresponding to the inner distance between said first and second legs 11, 12. The width in a direction corresponding to the longitudinal direction of the corner beam 1 is increased by outer and inner flanges 19 and 20 respectively on the inner upright 18A which, together with the sides 21, 22 parallel to the legs 11, 12, bear with their outsides against the respective leg 11, 12. In the contact surfaces, the outer upright 18A is joined to the legs 11, 12 by means of adhesively bonded joints 23A. By virtue of the legs 11, 12 on the corner beam 1 having a relatively great height and the wall uprights 16, by virtue of the flanges 19, 20, having a considerable extension in the longitudinal direction of the corner beam 1, a very strong joint is obtained.

On the inside of the legs 11–14 there is a recess 15 for outer and inner panels (not shown) which are firmly adhesively bonded.

The inner upright 17 rests directly on the plane, horizontal, second side 5 of the lower corner beam 1.

Figure 2:
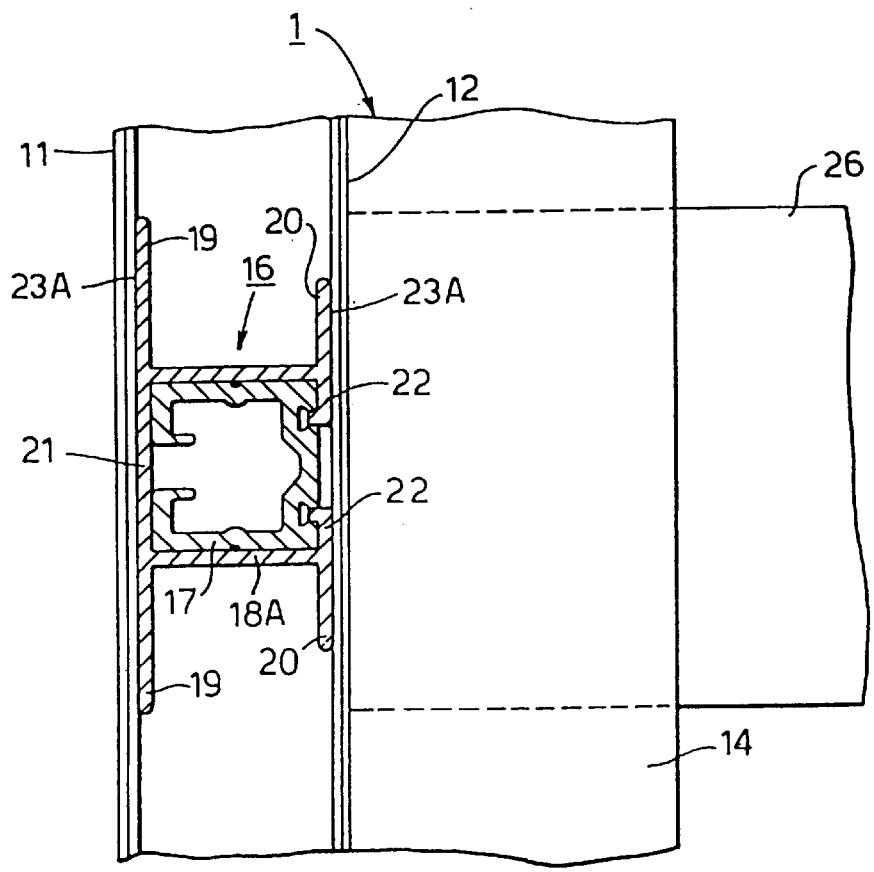
FIG. 2 represents a view II—II in FIG. 1.

In the same manner as the two vertical longitudinal legs 11, 12 accommodate between them and, by means of adhesively bonded joints, anchor a number of wall uprights 16, the two horizontal laterally directed legs 13, 14 accommodate between them a number of floor girders 26 which consist of a profile which is identical to that of the said outer uprights 18A, 18B, FIG. 2. For this reason, use is made of the same reference numbers for the legs 19, 20 of the profile which, together with the sides 21, 22 which are not visible in FIG. 1, bear against the inside of the legs 14, 13 and are joined to these by means of adhesively bonded joints 23B. The legs 14, 13 have an extent in the transverse direction of the beam 1 corresponding to the height of the legs 11, 12 and thus, together with the extent of the girder 26 in the longitudinal direction of the beam 1, give the same good adhesively bonded joint 23B as the firstmentioned adhesively bonded joint 23A. The floor girder 26 bears with its end against the vertical, third side 6 of the closed triangle 3 and extends over the entire width of the coachwork to be anchored on its other side in a similar, although mirror-inverted lower corner beam 1.

The outer corner side 4 of the closed triangle 3, which is inclined at 45° obliquely downwardly/inwardly, has a pair of mutually facing hooks 27 which define a longitudinal groove 28 for a series of hinges 29. In the groove 28 there is a first hinge profile 30 made of aluminium which is shaped as a female pan and which can extend along the entire length of the coachwork. A series of second hinge profiles 31 are shaped as male parts which can be rotated about a horizontal longitudinal axis of rotation by virtue of a tongue-shaped part 32 sliding in a matching groove in the female part profile 30. A pair of flanges 33, 34 on the profile 31 constitute attachments for hatch-doors 35 for the baggage compartments in the chassis of the vehicle. A sealing rubber strip 36 joins the female and male parts 30, 31 of the hinge 29. By virtue of the positioning of the hinge 30 on the downwardly/inwardly inclined outer corner side 4 of the lower corner beam 1, it is possible to arrange the outside of the hatch-doors 35 in a plane with the outside of the vehicle and also to be able to rotate the hinge 180° with simultaneous displacement of the hatch-door 35 in the lateral direction. The same hinge can also be used in the vertical position for, for example, doors in the coachwork.

The beam 1 can also expediently be included as a vertical corner upright in the coachwork body. In this case, the triangular cavity 3 is important in order to give the desired torsional rigidity.

With reference now to the upper part of FIG. 1, the upper, longitudinal corner beam 2 also consists of a profile comprising a closed polygon, more specifically a closed triangle 43 with an outer corner side 44 and second and third sides 45, 46. The outer corner side 44 is inclined in this case obliquely upwardly/inwardly at an angle of 15° in relation to the vertical plane and extends between a first and a second corner 47 and 48 respectively. The third corner 49 constitutes an inner corner, said second side 45 extending between the first corner 47 and said third, inner corner 49. The third side 46 thus extends between said second corner 48 and the inner corner 49. The interior of the triangle 43 constitutes in this case also a cavity which according to the preferred embodiment does not contain any partitions, filling or the like.

According to the embodiment, the triangle 43 is equilateral and said second side 45 is inclined at an angle of 15° obliquely upwardly/inwardly in relation to a horizontal plane.

From said first 47 and third 49 corners, a pair of first and second legs 51, 52 extend, mutually parallel, vertically downwards, in a plane with the first and second legs 11 and 12 respectively in the lower corner beam 1. From said second 48 and third 49 corners, a pair of mutually parallel third 53 and fourth 54 legs extend obliquely upwardly/inwardly at an angle of 105° in relation to said first and second legs 51, 52, corresponding to 15° in relation to the horizontal plane. The fourth leg 54 lies in a plane with the second, lower side 45 of the triangle 43. The distance between the third and fourth legs 53, 54 is the same as between the first and second legs 51, 52. The second and fourth legs 52, 54 are finished with a hook 57, 58 intended for attaching various types of tunnel-forming elements for ventilation, air-conditioning, cabling etc.

The upper ends of the wall uprights 16 are introduced between said first 51 and second 52 leg, the inner upright 17 bearing against the underside of the lower side 45 of the triangle 43, while the outer upright 18B is joined to the legs 51, 52 by means of adhesively bonded joints 23C in the same manner as the outer uprights 18A are joined to the vertical legs 51, 52 of the lower corner beam 1 by means of adhesively bonded joints 23A. In a corresponding manner, roof girders 56, which can be designed in an identical manner to the floor girders 26, are introduced between said third and fourth legs 53, 54 and joined to these by means of adhesively bonded joints 23D. The legs 51–54 also are substantially longer than any of the sides 44–46 in the triangle 43 and it is therefore clear that the adhesively bonded joints 23C and 23D also have very great strength.

In this connection, it is also to be mentioned that the roof girders 56, the wall uprights 16 and the floor girders 26 are arranged in coincident vertical planes in a manner which is known per se but which in this case, by virtue of the adhesively bonded joints 23A, 23B, 23C and 23D which all have a very great extent, gives an extremely strong and entirely play-free, coherent, adhesively bonded coachwork body.

Figure 3:
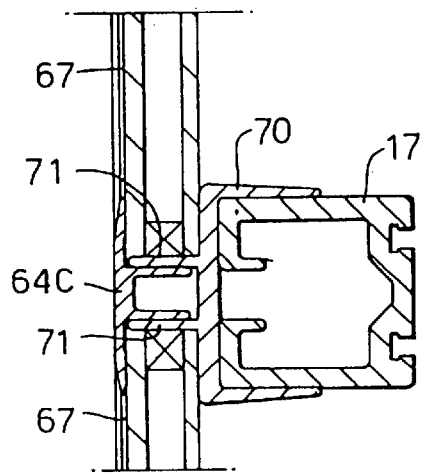
FIG. 3 represents a view III—III in FIG. 1.
Figure 4:
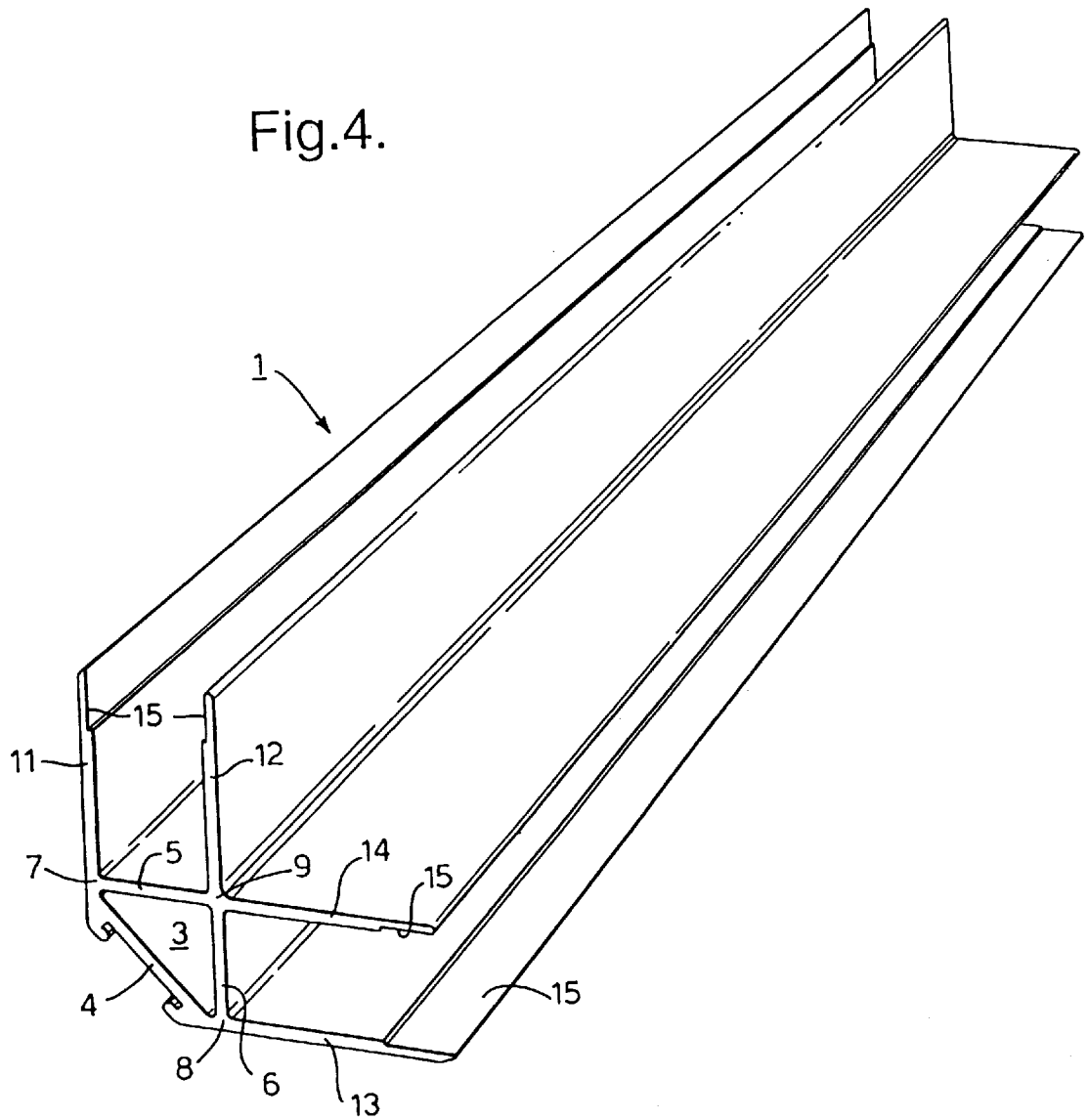
FIG. 4 is a perspective view of a lower corner beam.
Figure 5:
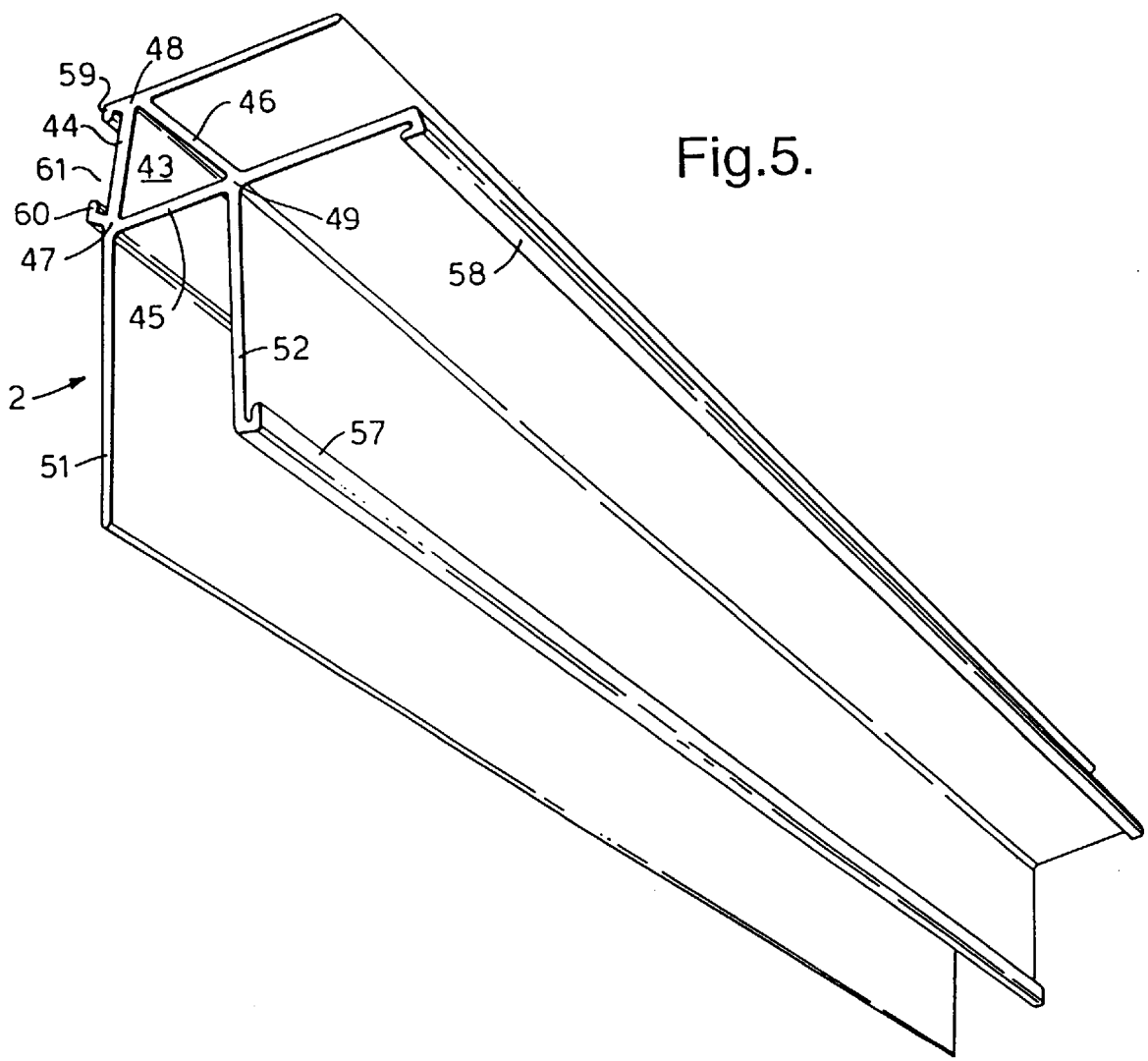
FIG. 5 is a perspective view of an upper corner beam.

On the outer corner side 44 of the upper corner beam 2 there is a pair of hooks 59, 60 which form between them a groove 61. Arranged on the lower 59 of these hooks is a covering corner profile 62. Below the corner profile 62 these is a complex, covering aluminium profile 63A which in its lower part accommodates an upper window moulding 64A and a profile 65A which constitute a combined fixing element for the window 67, fixing element for a curtain rod and internal fixing element. Arranged in a mirror-inverted manner under the window 67 there are corresponding profile elements 63B, 64B and 65B. The elements 63A, 63B and 65A, 65B respectively are fixed to the outer uprights 18B and 18A respectively by means of adhesively bonded joints 69. For fixing the window 67 in the vertical direction, the inner uprights 17 arranged between adjacent windows having been provided with a connected profile 70 which has a pair of outwardly facing flanges 71, FIG. 3, which accommodate between them a pressed-in vertical window moulding 64C which forms vertical grooves between its legs and said profile 70 for the windows 67.

All the elements described in this text, which can have the form of beams, girders, uprights, covering profiles, mouldings etc. consist of extruded aluminium profiles with the exception of the rubber strip 36.

In the coachwork construction described, the unbroken triangles 3 and 43 in the corner profiles 1 and 2 respectively have great importance. Unbroken triangles are to be understood as the same thing as the triangles forming closed cavities, i.e. their sides do not have any weakening, longitudinal grooves or the like. The triangles 3 and 43 convey forces from the legs 11 and 12, and 51, 52 respectively, to floor and roof via the floor legs 13, 14 and the roof less 53, 54 respectively, which forces can be very great without causing undesirable deformation, breaks in joins or similar damage.

Figure 6:
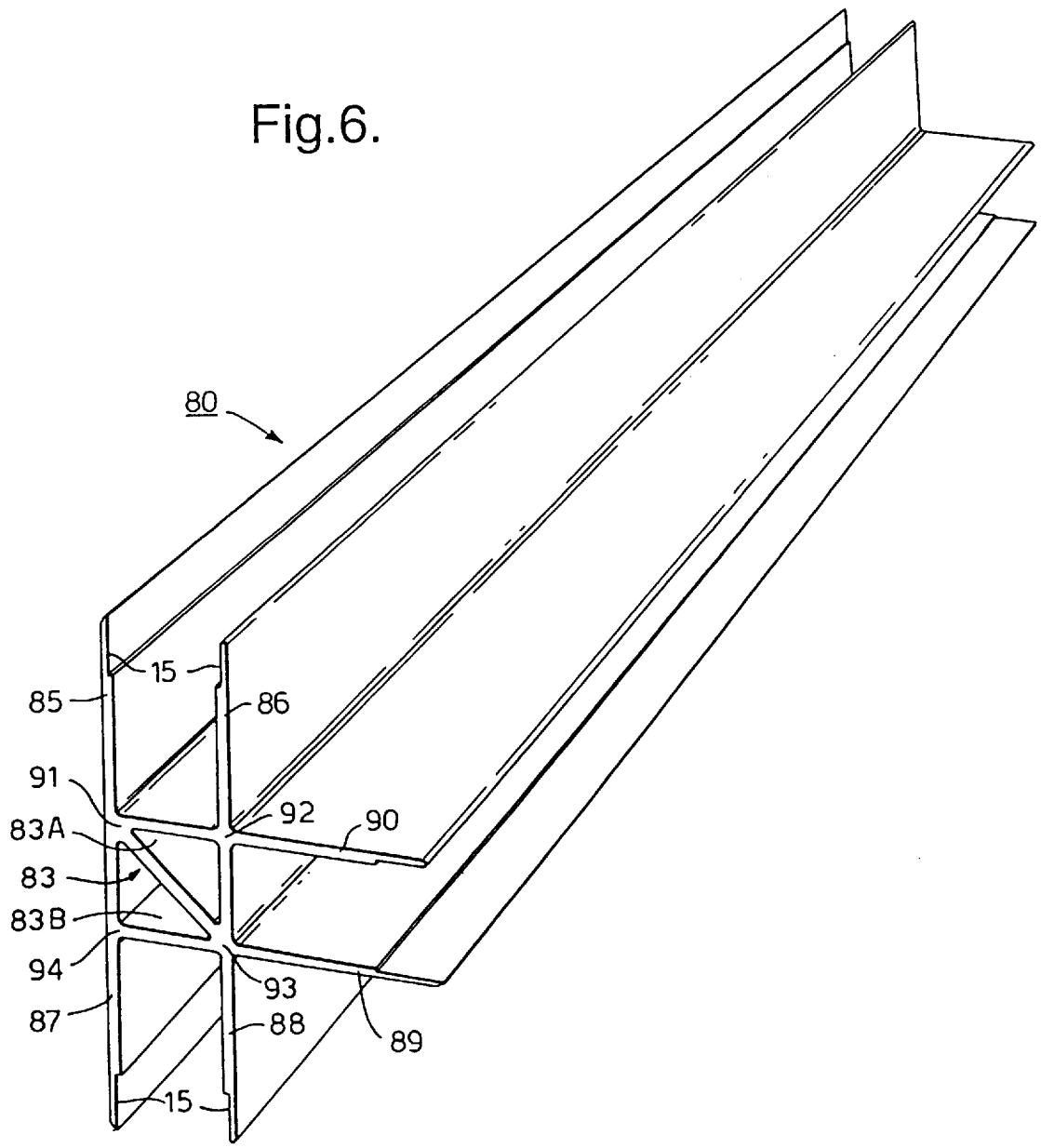
FIG. 6 is a perspective view of a beam intended to connect side walls and intermediate deck in a double-deck bus.

In the event that it is a matter of a double-deck bus, use can be made of the same construction for the lower and upper corners as described above. Furthermore, it is also possible to include in this case a beam 80, which otherwise matches the construction, of the type which is shown in FIG. 6 in order to connect the intermediate deck to the side walls. This beam also has a closed cavity 83 of square cross-section divided into two triangular spaces 83A, 83B by a diagonal partition 84. From the closed, square cavity 83 extend six legs 85, 86; 87, 88; and 89, 90 respectively, which are parallel in pairs and start from the four corners 91, 92, 93 and 94 of the square. Between the first, upwardly directed pair of legs 85, 86, and also between the downwardly directed pair of parallel legs 87, 88, wall uprights 16 (not shown) are arranged in the same manner as those between the legs 11, 12 and 51, 52 respectively in the corner profiles 1 and 2 respectively, as described above, the outer uprights being firmly adhesively bonded by means of their legs to said legs 85–88. Floor beams included in the intermediate deck are arranged in a corresponding manner and firmly adhesively bonded between the side legs 89, 90.

It is to be understood that further covering profile elements for wall, roof and floor facing are included in the coachwork, which elements have not been described here, since they do not affect the basic construction of the coachwork body. It may be mentioned in this connection, however, that the number of different elements is very limited, which is essentially made possible by the design of the lower and upper corner beams 1, 2, and the intermediate beam 80 respectively in the event that it is a matter of a coachwork for a double-deck bus.

We claim:

1. A metal beam (1, 2) for construction of a coachwork body for buses, trains and similar vehicles and connectable to profile elements (16, 26, 56) of the body, comprising a profile having a closed cavity (3, 43, 83) in the form of a polygon constituted by an isosceles triangle, at least four legs (11–14, 51–54) extending outwardly in pairs in different directions from the closed cavity, the legs in each pair being parallel and having a length greater than any side of the closed cavity, one side of the polygon between a first corner (7, 47) and second corner (8, 48) of the polygon forming an outer corner side (4, 44) of the beam, and a third corner (9, 49) of the polygon constituting an internal corner of the beam, and wherein the outer corner side (4, 44) is flat along substantially its entire length between the first and second corners of the polygon and forms the base of said isosceles triangle.

2. Beam according to claim 1, wherein the isosceles triangle is an equilateral triangle.

3. Beam according to claim 1, wherein a pair of first and second, mutually parallel legs (11, 12/51, 52) extend out from the first and respectively third corners (7, 47/9, 49) of the isosceles triangle.

4. Beam according to claim 3, wherein a pair of third and fourth, mutually parallel legs (13, 14/53, 54) extend out from the second and third corners (8, 9/48, 49) of the isosceles triangle.

5. Beam according to claim 4, wherein the parallel legs in one of the pair of legs form an angle with the legs in a second of the pair of legs which is greater than 90° but less than 120°.

6. Beam according to claim 4, wherein the parallel legs in a first of said pair of legs form a 90° angle with the legs in a second of said pair of legs.

7. Beam according to claim 5, wherein said first leg (51) forms an obtuse angle with a second side of the triangle which extends between the first corner (47) and third corner (49) of the triangle, and said third leg (53) forms an acute angle with a third side (46) which extends between the second and third corners of the triangle.

8. Beam according to claim 7, wherein said fourth leg (54) lies in a plane with the second side of the triangle.

9. Coachwork body comprising in a longitudinal upper and lower corner a beam (1, 2) having a profile with a closed cavity (3, 43, 83) in the form of a polygon constituted by an isosceles triangle, at least four legs (11–14, 51–54) extending outwardly in pairs in different directions from the closed cavity, the legs in each pair being parallel and having a length greater than any side of the closed cavity, one side of the polygon between a first corner (7, 47) and second corner (8, 48) of the polygon forming an outer corner side (4, 44) of the beam, and a third corner (9, 49) of the polygon constituting an internal corner of the beam, and wherein the outer corner side (4, 44) is flat along substantially its entire length between the first and second corners of the polygon and forms the base of said isosceles triangle.

10. Coachwork body according to claim 9, wherein on both sides of the coachwork body, there is the lower longitudinal beam (1) in a lower corner of the coachwork body and an upper longitudinal corner beam (2) in an upper corner of the coachwork body, and first and second legs (11, 12) of the lower beam (1) extend vertically upwards and lie in a plane with first and second legs (51, 52) on the upper longitudinal corner beam (2), which first and second legs extend vertically downwards from said upper longitudinal beam (2), and vertical corner uprights are arranged between the vertical legs of the two longitudinal beams and joined to these by means of adhesively bonded joints (23A, 23C).

11. Coachwork body according to claim 10, wherein said vertical uprights rest on a horizontal side (5) of said closed cavity polygon (3).

12. Coachwork body according to claim 11, wherein transverse floor girders (26) extend between the lower longitudinal corner beams (1) on both sides of the coachwork body, and ends of the floor girders (26) are introduced between third and fourth legs (13, 14) of two lower longitudinal beams (1), and the floor girders (26) are joined to said horizontal legs (13, 14) by means of adhesively bonded joints (23B).

13. Coachwork body according to claim 11, wherein roof girders (56) are arranged between the two upper longitudinal beams (2) in upper corners of the coachwork body, and ends of said roof girders (56) are introduced between third and fourth legs (53, 54) of the respective upper corner beam (2), and the roof girders (56) are joined to said third and fourth legs (53, 54) by means of adhesively bonded joints (23D).

14. Coachwork body according to claim 9 for a double-deck bus, wherein a beam (80) is arranged in a region of an intermediate deck with a first pair of parallel legs (89, 90) which extend horizontally out from a rectangular, closed cavity (83) in the beam profile, starting from a pair of the four corners of the cavity, and a second pair of parallel legs (85 86) extends parallel vertically upwards and a third pair of parallel legs (87, 88) extends parallel downwards, starting from the corners of the closed cavity profile, the horizontal legs being arranged to accommodate between them beams forming part of an intermediate deck, joined to said horizontal legs by means of adhesively bonded joints, and the vertical upwardly directed and respectively the vertically downwardly directed legs are arranged to accommodate between them wall uprights joined to said legs by means of adhesively bonded joints.

* * * * *